(12) United States Patent
Czarnek

(10) Patent No.: US 9,086,314 B2
(45) Date of Patent: Jul. 21, 2015

(54) BATTERY-LESS ACTIVE FLOAT FOR INDUCTIVE SENSOR FOR MONITORING FLUID LEVEL AND DISPLACEMENT

(71) Applicant: Czarnek & Orkin Laboratories, Inc., Highland Park, IL (US)

(72) Inventor: Robert Czarnek, Johnstown, PA (US)

(73) Assignee: Czarnek & Orkin Laboratories, Inc., Highland Park, IL (US)

( * ) Notice: Subject to any disclaimer, the term of this patent is extended or adjusted under 35 U.S.C. 154(b) by 507 days.

(21) Appl. No.: 13/668,769

(22) Filed: Nov. 5, 2012

(65) Prior Publication Data

US 2013/0139586 A1    Jun. 6, 2013

Related U.S. Application Data

(60) Provisional application No. 61/566,246, filed on Dec. 2, 2011.

(51) Int. Cl.
*G01F 23/68* (2006.01)
*G01F 23/76* (2006.01)

(52) U.S. Cl.
CPC .............. *G01F 23/683* (2013.01); *G01F 23/68* (2013.01); *G01F 23/76* (2013.01)

(58) Field of Classification Search
CPC ........ G01F 23/68; G01F 23/683; G01F 23/76
See application file for complete search history.

(56) References Cited

U.S. PATENT DOCUMENTS

| | | |
|---|---|---|
| 2,424,766 A | 7/1947 | Miner |
| 2,452,156 A | 10/1948 | Schover |
| 3,703,829 A | 11/1972 | Dougherty |
| 3,834,234 A | 9/1974 | Kobayashi et al. |
| 3,896,671 A | 7/1975 | Marinaccio |
| 3,921,461 A | 11/1975 | Layton |
| 3,948,100 A | 4/1976 | Paris et al. |
| 3,996,801 A | 12/1976 | Playfoot et al. |
| 4,052,900 A | 10/1977 | Ganderton |
| 4,091,671 A | 5/1978 | McLees |
| 4,279,149 A | 7/1981 | Block |
| 4,282,485 A | 8/1981 | Pauwels et al. |
| 4,447,743 A | 5/1984 | Bean et al. |
| 4,513,617 A | 4/1985 | Hayes |
| 4,627,280 A | 12/1986 | Hayashi et al. |
| 4,724,705 A | 2/1988 | Harris |
| 4,771,804 A | 9/1988 | Morales |

(Continued)

FOREIGN PATENT DOCUMENTS

EP    0211142 A2    2/1987

*Primary Examiner* — Paul West
(74) *Attorney, Agent, or Firm* — The Webb Law Firm

(57) ABSTRACT

A fluid level sensor system includes a primary coil, at least one secondary coil adjacent the primary coil, a control system operative for applying a time varying signal to the primary coil and for detecting a response of the secondary coil to the time varying signal in the primary coil, and at least one float resonator adapted to move adjacent the primary and secondary coils. Each float resonator includes an electrical storage device and a circuit which is switchable between a first state that enhances the response of a section of the secondary coil adjacent the float resonator to the time varying signal in the primary coil and the charging of the electrical storage device, and a second state where the effect of the circuit on the response of the secondary coil to the time varying signal in the primary coil is diminished relative to the first state.

24 Claims, 7 Drawing Sheets

(56) References Cited

U.S. PATENT DOCUMENTS

| | | |
|---|---|---|
| 4,783,626 A | 11/1988 | Shimizu |
| 4,799,047 A | 1/1989 | Saitoh |
| 4,831,878 A | 5/1989 | Hayashi et al. |
| 4,833,919 A | 5/1989 | Saito et al. |
| 4,887,465 A | 12/1989 | Bryne et al. |
| 4,891,980 A | 1/1990 | Kawai et al. |
| 4,950,988 A | 8/1990 | Garshelis |
| 5,061,896 A | 10/1991 | Schmidt |
| 5,078,010 A | 1/1992 | Lock |
| 5,103,674 A | 4/1992 | Outwater et al. |
| 5,138,881 A | 8/1992 | Riley et al. |
| 5,146,784 A | 9/1992 | Maresca, Jr. et al. |
| 5,150,615 A | 9/1992 | Rymut et al. |
| 5,291,782 A | 3/1994 | Taylor |
| 6,192,753 B1 | 2/2001 | Czarnek |
| 6,192,754 B1 | 2/2001 | Czarnek |
| 6,474,158 B2 | 11/2002 | Czarnek |

| | EXCITATION OF PRIMARY COIL 8 | FLOAT 1 (20-1) | FLOAT 2 (20-2) | |
|---|---|---|---|---|
| STANDBY | OFF | HF | HF | |
| CHARGE (BLOCK) | ON | HF | HF | ⎫ |
| 1st RESET | OFF | HF | HF | ⎬ CHARGE STORAGE DEVICE 26 |
| CHARGE (BLOCK) | ON | HF | HF | ⎭ |
| 2nd RESET | OFF | HF | HF | |
| CHARGE (BLOCK) | ON | HF | HF | ← 30 |
| READ 1 (BLOCK) | ON | HF | LF | ← 32 |
| READ 2 (BLOCK) | ON | LF | HF | ← 34 |
| BASELINE | ON | LF | LF | ← 36 |
| STANDBY | OFF | HF | HF | |

FIG. 4

|  | EXCITATION OF PRIMARY COIL 8 | (20-1) FLOAT 1 | | (20-2) FLOAT 2 | |
|---|---|---|---|---|---|
| STANDBY | OFF | HF | | HF | |
| CHARGE (BLOCK 1) | ON | ■ | HF | ■ | HF |
| CHARGE (BLOCK 2) | | ■ | HF | LF | |
| CHARGE (BLOCK 3) | | LF | | ■ | HF |
| CHARGE (BLOCK 4) | ON | LF | | LF | |
| CHARGE (BLOCK 5) | ON | ■ | HF | ■ | HF |
| CHARGE (BLOCK 6) | | ■ | HF | LF | |
| RESET | OFF | HF | | HF | |
| CHARGE | ON | ■ | HF | ■ | HF ← 30 |
| READ 1 | ON | ■ | HF | LF | ← 32 |
| READ 2 | ON | LF | | ■ | HF ← 34 |
| BASELINE | ON | LF | | LF | ← 36 |
| STANDBY | OFF | HF | | HF | |

CHARGE STORAGE DEVICE 26 (BLOCKS 1–6)

FIG. 5

BATTERY-LESS ACTIVE FLOAT FOR INDUCTIVE SENSOR FOR MONITORING FLUID LEVEL AND DISPLACEMENT

CROSS REFERENCE TO RELATED APPLICATION

This application claims priority from U.S. Provisional Patent Application No. 61/566,246, filed Dec. 2, 2011, which is incorporated herein by reference.

BACKGROUND OF THE INVENTION

1. Field of the Invention

This invention relates to a sensor system for monitoring fluid level and displacement and, more particularly, to a sensor system for monitoring the level of crude oil or crude oil and water in storage containers.

2. Description of Related Art

An inductive level sensor currently used by the oil industry for single fluid applications uses a single toroid shaped float including an LC resonator comprised of a coil and a capacitor imbedded in a buoyant material. In dual fluid applications, such as crude oil and water, the sensor is equipped with two so-called active floats, each comprised of an LC resonator, a switch, a control circuit and a battery powering the circuit imbedded in a buoyant material. Since the circuit is permanently connected to the battery, the life of such float resonator is limited, depending mostly on the temperature of the float resonator in operation, and the type and capacity of the battery. Failure of the float resonator due to the end of life of the battery results in expensive, periodic replacement of both floats. Herein, "float" and "float resonator" may be used interchangeably.

An attempt was made in the past to design a battery-less float resonator based on a large coil with a tap that would produce enough energy to power the float resonator circuit during measurement (see e.g., U.S. Pat. No. 6,474,158, which is incorporated herein by reference). However, the size and, therefore, large weight of the coil required by such circuit made the design not practical for commercialization. Also, the described measurement sequence required large storage and long charging time making the sensor slow and unreliable especially at higher temperatures where power consumption increased due to increased leakage of electronic components and charging ability decreased due to increased resistance of the coil wire. In addition, the dual frequency design disclosed in U.S. Pat. No. 6,474,158 required precise tuning of the resonator circuit. This requirement translated to matching two capacitors and one coil for each float resonator to tolerances that were difficult and expensive to implement. Also the dual frequency design required that during the measuring sequence, the float resonator circuit be powered from the storage capacitor without any additional recharging during the measuring sequence.

It would be desirable to overcome the above problems and others by providing a fluid sensor having one or more active float resonators, each equipped with a power supply that can be energized by the primary coil of the sensor.

SUMMARY OF THE INVENTION

Disclosed herein is a fluid level sensor system comprising: a primary coil; at least one secondary coil adjacent the primary coil; a control system operative for applying a time varying signal to the primary coil and for detecting a response of the secondary coil to the time varying signal in the primary coil; and at least one float resonator adapted to move adjacent the primary and secondary coils, wherein each float resonator includes an electrical storage device that is chargeable in response to the time varying signal in the primary coil and a circuit which is switchable between: a first state that enhances the response of a section of the secondary coil adjacent the float resonator to the time varying signal in the primary coil and the charging of the electrical storage device; and a second state where the effect of the circuit on the response of the secondary coil to the time varying signal in the primary coil is diminished relative to the first state.

The electrical storage device is desirably a secondary, rechargeable battery or a capacitor, but not a primary, disposable battery designed to be used once and then discarded.

In the first state, the circuit can enhance coupling of the time varying signal to the section of the secondary coil adjacent the float resonator. In the second state, the circuit does not enhance coupling of the time varying signal to the section of the secondary coil adjacent the float resonator.

In the first state, the circuit can be substantially in resonance with the time varying signal. In the second state, the circuit can be substantially out of resonance with the time varying signal.

In the first state, the circuit can be substantially in resonance with the time varying signal and, in the second state, the circuit can dissipate electrical energy that would not be dissipated by the circuit in the first state.

The electrical storage device can charge when the circuit is in the first state. Following charging of the electrical storage device, the control system can sample the response of the secondary coil to the time varying signal in the primary coil when the circuit is in the first state.

The secondary coil can have a winding density distribution that facilitates the control system determining a position of the float resonator adjacent the secondary winding based on the sampled response of the secondary coil to the time varying signal in the primary coil when the circuit is in the first state.

The system can include first and second float resonators adapted to float on a first fluid having a first density that floats atop of a second fluid having a second, greater density, respectively. When the circuits of the first and second float resonators are in their respective first and second states, the control system can sample a first response of the secondary coil to the time varying signal in the primary coil corresponding to a position of the first float resonator adjacent the secondary coil. When the circuits of the first and second float resonators are in their respective second and first states, the control system can sample a second response of the secondary coil to the time varying signal in the primary coil corresponding to a position of the second float resonator adjacent secondary coil.

Each circuit can include a counter operating under the control of a reset circuit for controlling when the circuit is in the first state or the second state. The reset circuit of each float resonator, after a period following termination of the time varying signal in the primary coil, outputs to the counter of said float resonator a reset signal that causes said counter to maintain the circuit in the first state or to switch the circuit back to the first state from the second state.

The circuit can include a first capacitor (C1) and a coil (L1) in parallel with a series combination of a switch (Q1) and a second capacitor (C2). In the first state of the circuit, the switch can be open whereupon C2 is not connected in parallel with C1 and L1 and the circuit has a first resonant frequency. In the second state of the circuit, the switch can be closed whereupon C2 is connected in parallel with C1 and L1 and the circuit has a second resonant frequency that is lower than the first resonant frequency.

Alternatively, the circuit can include a first capacitor (C1) and a coil (L1) in parallel with a series combination of a switch (Q1) and a resistor (R1). In the first state of the circuit, the switch can be open wherein R1 is not connected in parallel with C1 and L1 and R1 does not dissipate electrical energy. In the second state of the circuit, the switch can be closed wherein R1 is connected in parallel with C1 and L1 and R1 dissipates electrical energy.

When the circuit is in the first state, the secondary coil can output a signal having a first amplitude in response to the time varying signal in the primary coil. When the circuit is in the second state, the secondary coil can output a signal having a second, lower amplitude in response to the time varying signal in the primary coil.

The control system can be operative for: detecting a first response of the secondary coil to the time varying signal in the primary coil corresponding to a position of the first float resonator adjacent the secondary coil when the circuit is in the first state; detecting a second response of the secondary coil to the time varying signal in the primary coil corresponding to the position of the first float resonator adjacent the secondary coil when the circuit is in the second state; and determining the position of the first float resonator along the secondary coil based on a difference between the first and second detected responses.

Also disclosed is a fluid level sensor system comprising: a plurality of elongated, coaxial coils including a primary coil, a first secondary coil and a second secondary coil; a control system operative for applying a time varying signal to the primary coil and for detecting responses of the first and second secondary coils to the time varying signal in the primary coil; and first and second float resonators adapted to float on a first fluid having a first density that floats atop of a second fluid having a second, greater density, respectively, wherein each float resonator includes an electrical storage device and a circuit which is switchable between: a first state that enhances the response of sections of the first and second secondary coils adjacent the float resonator to the time varying signal in the primary coil and the charging of the electrical storage device of said float resonator; and a second state where the effect of the circuit on the response of the first and second secondary coils to the time varying signal in the primary coil is diminished relative to the first state, wherein: the circuits of the first and second float resonators are adapted to be in their respective first and second states when the control system detects the response of the first and second secondary coils to the time varying signal in the primary coil corresponding to the position of the first float resonator along the length of the plurality of coils; and the circuits of the first and second float resonators are adapted to be in their respective second and first states when the control system detects the response of the first and second secondary coils to the time varying signal in the primary coil corresponding to the position of the second float resonator along the length of the plurality of coils.

The electrical storage device is desirably a secondary, rechargeable battery or a capacitor, but not a primary, disposable battery that is designed to be used once and then discarded.

The circuit of each float resonator in the second state can diminish the charging of the electrical storage device of said float resonator relative to when said circuit is in the first state.

In the first state, the circuit of each float resonator can enhance coupling of the time varying signal to the section of the first and second secondary coils adjacent said float resonator. In the second state, the circuit of each float resonator may not enhance coupling of the time varying signal to the section of the first and second secondary coils adjacent said float resonator.

In the first state, the circuit of each float resonator can be substantially in resonance with the time varying signal. In the second state, the circuit of each float resonator can be substantially out of resonance with the time varying signal.

In the first state, the circuit of each float resonator can be substantially in resonance with the time varying signal. In the second state, the circuit of each float resonator dissipates electrical energy that would not be dissipated by the circuit in the first state.

Also disclosed herein is a method of operating a sensor system comprising an elongated primary coil; a plurality of elongated secondary coils coaxial with the primary coil; a control system operative for applying a time varying signal to the primary coil and for detecting a response of each secondary coil to the time varying signal in the primary coil; and first and second float resonators adapted to move adjacent the primary and secondary coils, wherein each float resonator includes an electrical storage device and a circuit that is switchable between: a first state that enhances the effect of the float resonator on the responses of sections of the secondary coils adjacent the float resonator to the time varying signal in the primary coil and the charging of the electrical storage device of said float resonator; and a second state that does not enhance the effect of the float resonator on the responses of sections of the secondary coils adjacent the float resonator to the time varying signal in the primary coil.

The method comprises: (a) causing the circuit of each float resonator to be in the first state during charging of the electrical storage device of said float resonator via the time varying signal in the primary coil; (b) following step (a), the control system detecting a first response of the secondary coils to the time varying signal in the primary coil when the circuits of the first and second float resonators are in their respective first and second states; (c) following step (b), the control system detecting a second response of the secondary coils to the time varying signal in the primary coil when the circuits of the first and second float resonators are in their respective second and first states; and (d) following step (c), the control system determining positions of the first and second float resonators along the elongated secondary coils based on the respective first and second detected responses.

The electrical storage device is desirably a secondary, rechargeable battery or a capacitor, but not a primary, disposable battery that is designed to be used once and then discarded.

The first and second states of each float resonator can correspond to respective increased and not increased magnetic coupling between the primary coil and the secondary coils.

The second state of each float resonator can correspond to decreased energy transfer from the primary coil to the secondary coils relative to the energy transfer in the first state of said float resonator.

BRIEF DESCRIPTION OF THE DRAWINGS

FIGS. 4 and 5 are exemplary timing sequences for a two-float resonator sensor system, with each float resonator including the resonator circuit shown in FIG. 3, wherein high amplitudes are graphically illustrated by grey bars and low amplitudes are represented as vertical lines;

DETAILED DESCRIPTION OF THE INVENTION

The present invention will now be described with reference to the accompanying figures where like reference numbers correspond to like elements.

Figure 1:
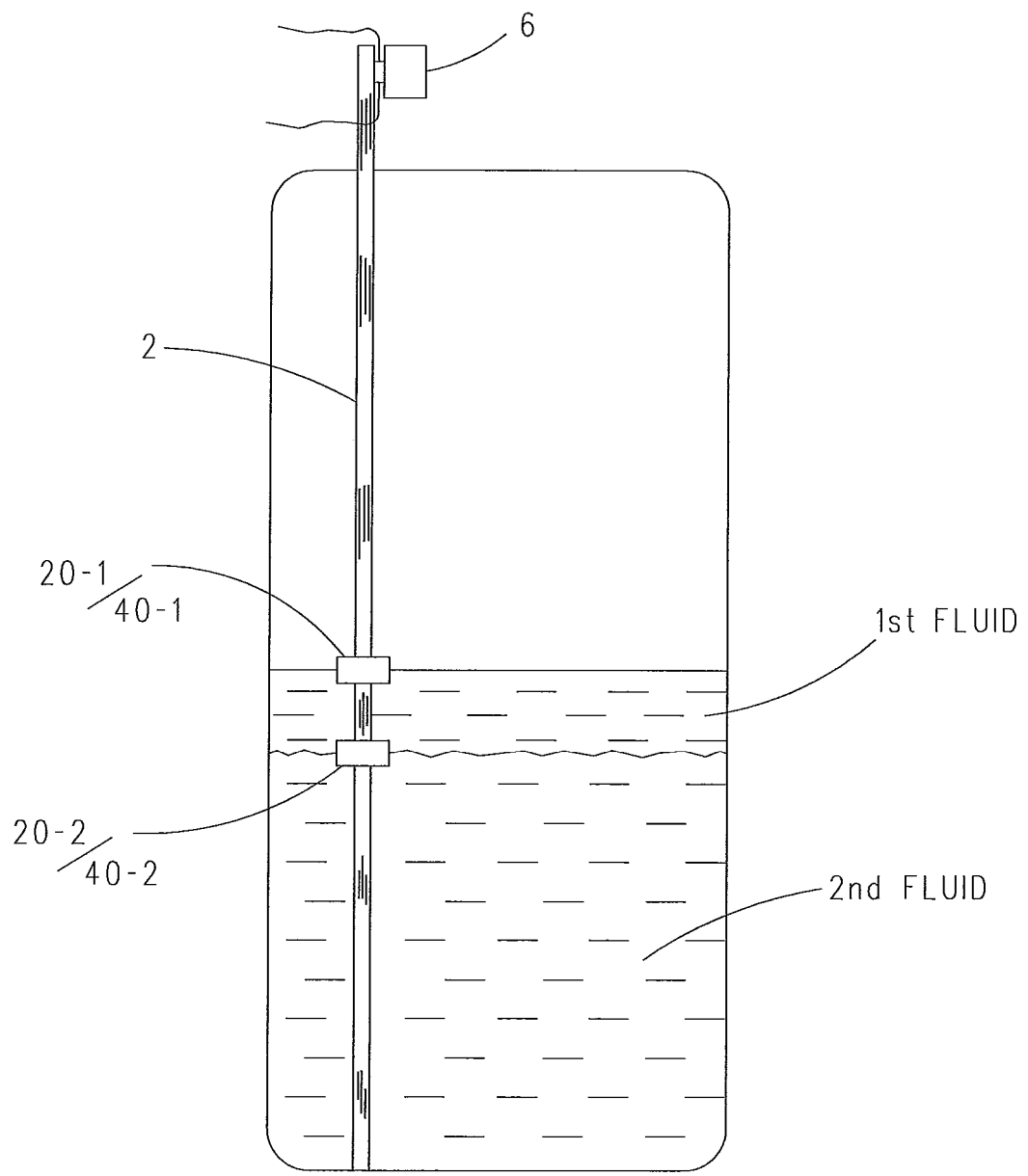
FIG. 1 is a side elevational view of a fluid sensor system in accordance with the present invention positioned to detect the levels of two fluids.
Figure 2:
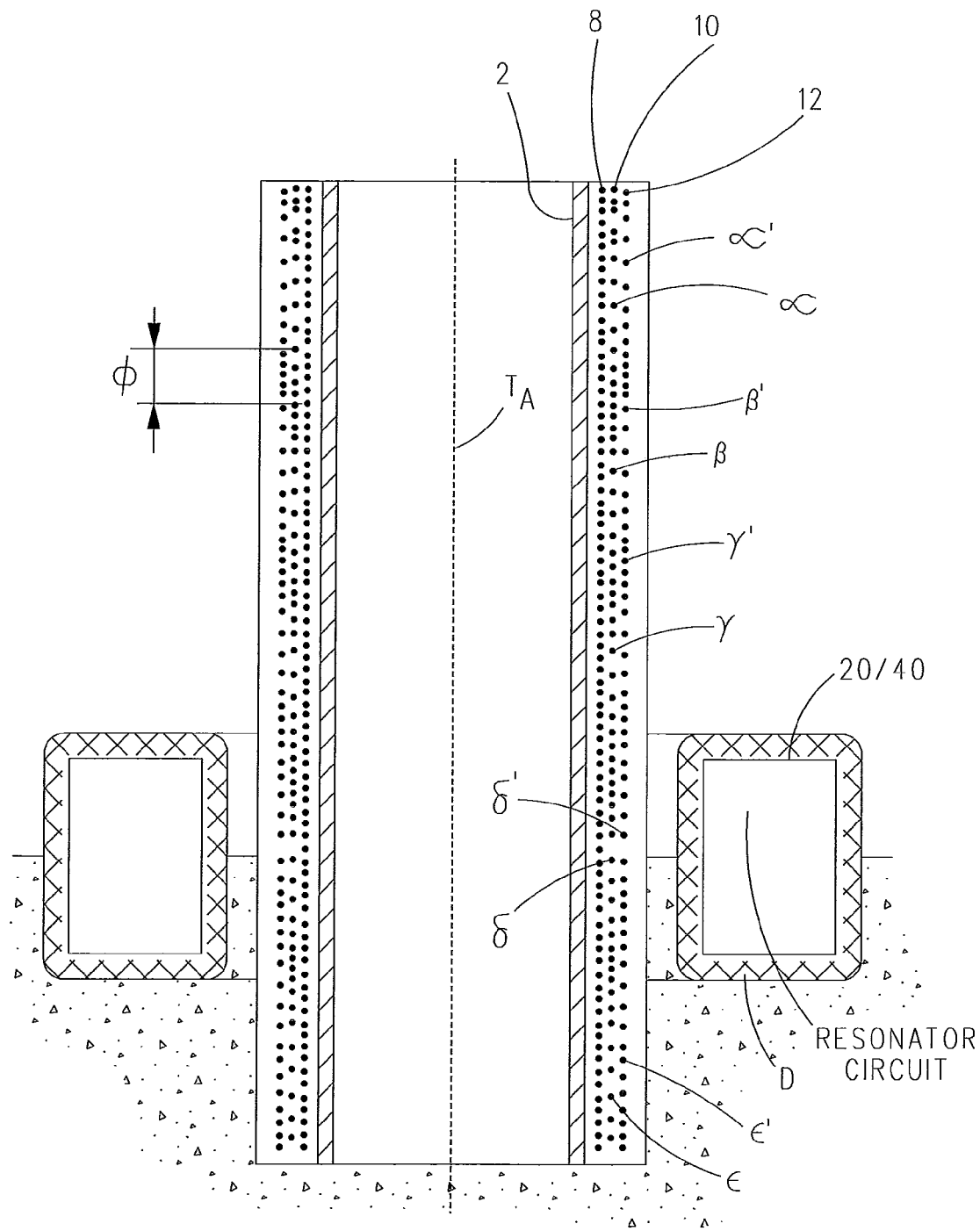
FIG. 2 is a sectional view of a portion of the fluid sensor system of FIG. 1 including a tube with coils and a float resonator including a resonator circuit.

With reference to FIGS. 1 and 2, the sensor system described herein includes a tube 2 having a first end, a second end and a longitudinal axis Ta extending therebetween. Desirably, axis Ta of tube 2 is straight but this is not to be construed as limiting the invention. The sensor system further includes a first float resonator 20-1 adapted to move adjacent the tube between the ends thereof for detecting a level of a first fluid, such as water, or oil, or gasoline, and a control system 6. A primary coil 8 is wound around the longitudinal axis Ta between the ends of tube 2. The primary coil 8 produces a time varying electromagnetic field in response to receiving a time varying (AC) signal output by control system 6 at a predetermined frequency. A first secondary coil 10 is wound around longitudinal axis Ta at a first periodically varying winding density distribution between the ends of tube 2. An optional second secondary coil 12 can be wound around longitudinal axis Ta at the first periodically varying winding density distribution between the ends of the tube 2. The winding density distribution of the second secondary coil 12 (when provided) is shifted relative to the winding density distribution of the first secondary coil 10. Desirably, coils 8, 10 and 12 are formed within a wall of tube 2.

In response to excitation by the time varying electromagnetic field output by primary coil 8 in response to the time varying (AC) signal output to primary coil 8 by control system 6, the first and second secondary coils 10 and 12 produce first and second AC signals having amplitudes that vary periodically in response to movement of the first float resonator 20-1 between the ends of tube 2. Further details regarding tube 2, and coils 8, 10 and 12 can be found in U.S. Pat. No. 6,192,753 and U.S. Pat. No. 6,192,754, which are incorporated herein by reference.

The sensor system can optionally include a second float resonator 20-2 adapted to move adjacent the tube 2 between the ends thereof for detecting a level of a second fluid (e.g., water) which has a greater density than the first fluid (e.g., oil) under the first fluid.

The float resonator design described herein allows operation of the sensor system with a single frequency for both charging and measurement cycles. Such approach allows making coil L1 (FIG. 3) of each float resonator 20 smaller and lighter and allows control system 6 to use a simpler generator circuit that does not require change of frequency during operation.

Figure 3:
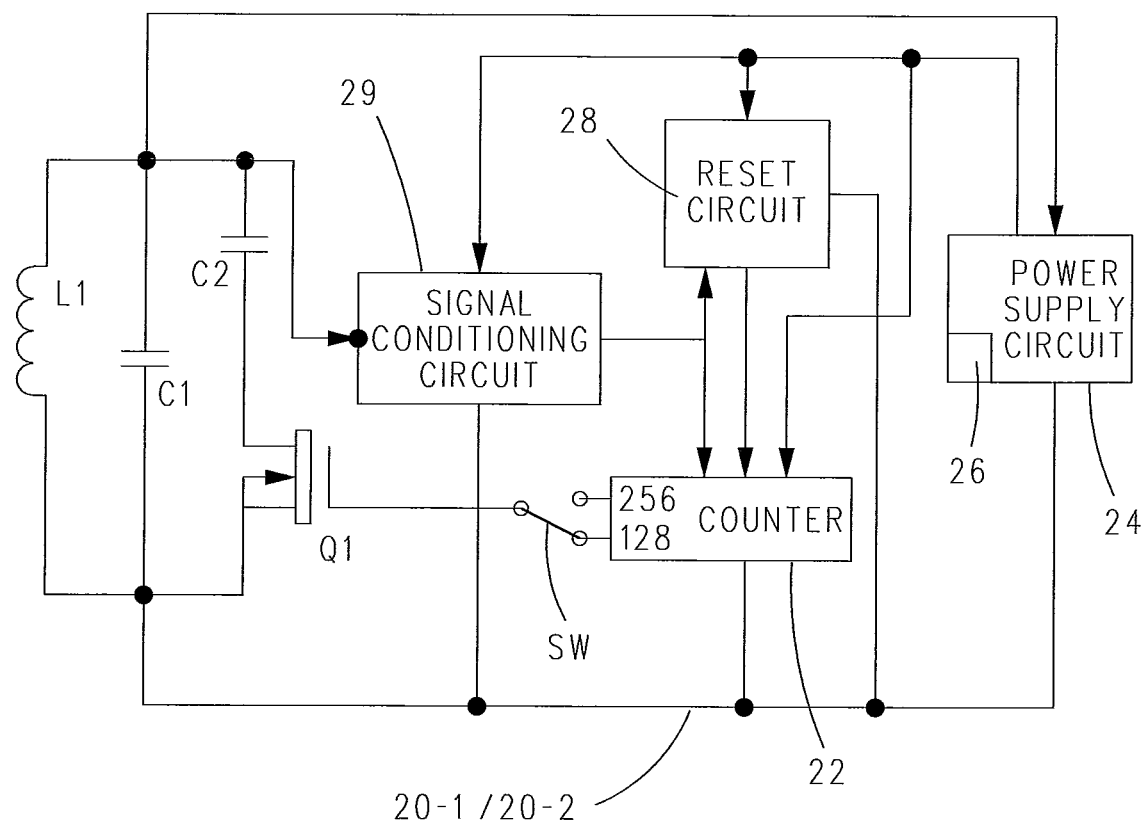
FIG. 3 is a combined block diagram and schematic illustration of a first embodiment resonator circuit that can comprise the sensor system shown in FIGS. 1 and 2.

With reference to FIG. 3 and with continuing reference to FIGS. 1 and 2, each float resonator 20-1 and 20-2 comprises a coil L1, a capacitor C1 and a capacitor C2. Capacitor C2 is controlled by a switch Q1. When switch Q1 is in the OFF (or open) state capacitor C2 is disconnected and the resonant frequency of the float resonator 20 is equal to a first, high frequency (HF) resonant frequency of the parallel combination of L1 and C1. In one desirable embodiment this first frequency is 2500 Hz. When the switch Q1 is switched to its ON (or closed) state, C2 is connected in parallel with L1 and C1, whereupon the resonant frequency of the resonator changes to a second, low frequency (LF) resonant frequency determined by the parallel combination of L1, C1 and C2. In one desirable embodiment this second resonant frequency is 1000 Hz.

Switch Q1 is controlled by the output of a counter 22. During a first block of N counts (e.g., 0-127 counts) counted by counter 22, the control signal output by counter 22 to the control input of switch Q1 is not asserted (e.g., a low or unasserted state) whereupon switch Q1 is OFF (or open). Once the count reaches a predetermined value, e.g., 128, this control signal changes to a high or asserted state thereby turning switch Q1 ON (or closed).

In a standby state, the circuitry of each float resonator 20-1 and 20-2 is not powered and, as mentioned earlier, switch Q1 is in OFF (or open) state. When the coil L1 of each float resonator 20-1 and 20-2 receives the time varying electromagnetic field at the HF resonant frequency from primary coil 8, the LC circuit (L1, C1) starts resonating at the HF resonant frequency, thereby generating AC voltage on the terminals of coil L1. This AC voltage is converted by a power supply circuit 24 into a DC voltage which is stored on a storage device 26, such as a storage capacitor, of power supply circuit 24. The counter circuit 22 of each float resonator 20-1 and 20-2 is typically set to turn switch Q1 ON (closed) after X excitation cycles, where X is typically an integer number between 64 and 256 and X is a different value for each float resonator 20-1 and 20-2. For example, without limitation, switch Q1 in float resonator 20-1 changes its state every X cycles and switch Q1 of float resonator 20-2 changes state every 2x cycles. This means that the block of counts counted by the counter 22 of each float resonator 20 in response to excitation of coil L1 when the storage device 26 thereof is being charged cannot be longer than the OFF (or open) state of switch Q1. In addition, the time it takes to charge storage device 26 to a suitable operating voltage depends on the temperature and, to a lesser degree, the position of the float resonator 20 along tube 2.

With reference to FIG. 4 and with continuing reference to FIGS. 1-3, to avoid these problems, each float resonator 20 includes a reset circuit 28. Reset circuit 28 is a timer that generates a reset signal to counter 22 after a predetermined period of inactivity when primary coil 8 is not producing a time varying electromagnetic field in response to receiving a time varying signal from control system 6. In one desirable non-limiting embodiment, this period is between 3 ms and 5 ms. The use of reset circuit 28 dictates that the charging of storage device 26 is performed in blocks of counts of counter 22. Control system 6 generates a block of oscillations with the number of cycles equal to or smaller than the number of counts counted by counter 22 during the OFF (or open) period of switch Q1—before counter 22 turns Q1 ON (closed)—i.e., when the control signal output by counter 22 to the control input of transistor Q1 is not asserted, and, hence, Q1 is in the OFF (or open) state, followed by a period of inactivity (a reset period) slightly longer than the time reset circuit 28 takes to generate the reset signal. This sequence is repeated (one or more times) as necessary to charge or maintain storage device 26 at a suitable operating voltage for the operation of, among other things, counter 22, reset circuit 28, and signal conditioning circuit 29 of float resonator 20. Hence, storage device 26 can be charged in discrete steps, i.e., charge, reset, charge, reset, etc.

In an alternate method of charging storage device 26 shown in FIG. 5, the excitation signal output by primary coil 8 is provided continuously for a predetermined number of excitation cycles (or blocks of excitation cycles), e.g., six blocks of excitation cycles in FIG. 5, followed by a period of inactivity, e.g., one reset cycle, for the purpose of allowing reset circuit 28 to reset counter 22. In this case, during charging of storage device 26 and once storage device 26 reaches a sufficient voltage level, switch Q1 in each float resonator switches between OFF (open state), a HF resonating frequency, and ON (closed state) a LF resonating frequency, and vice versa, every preprogrammed number of excitation cycles resulting in a predetermined duty cycle, e.g., 50%, of the charging sequence. For example, without limitation, in the examples shown in FIG. 5, float resonator 1 (20-1) charges during blocks 1, 2, 5 and 6 of excitation cycles when float resonator 1 is in the HF resonating frequency state while float resonator 2 (20-2) charges during blocks 1, 3, and 5 of excitation cycles when float resonator 2 is in the HF resonating frequency state. The storage device 26 in each float resonator, however, is not charged during the LF resonating frequency state of the corresponding float resonator 20.

Once the charging of each storage device 26 is complete, power supply circuit 24 is ready for use and counter 22 is reset to zero by reset circuit 28, which is desirably adapted to reset counter 22 once storage device 26 has been charged. For example, without limitation, the reset circuit 28 of each float resonator 20-1 and 20-2 can be adapted to reset its counter 22 after six blocks of excitation cycles shown in FIG. 5. However, the number of blocks in FIG. 5 used for charging storage device 26 of each float resonator 20 is not to be construed as limiting the invention. Moreover, each block of excitation cycles can be any suitable and/or desirable number of excitation cycles, e.g., ≥1. The operation of the sensor system after the storage device 26 in each float resonator has been charged will now be described.

With ongoing reference to FIGS. 4 and 5, in one embodiment, the sensor system includes float resonators 20-1 and 20-2 shown in FIG. 1. The first float resonator 20-1 is adapted to stay in the high frequency (HF) state for 2N excitation cycles 30 and 32 of primary coil 8. In the examples shown in FIGS. 4 and 5, each block of excitation cycles is comprised of N excitation cycles where N≥1. After 2N excitation cycles 30 and 32, counter circuit 22 of float resonator 20-1 turns its switch Q1 to the ON (closed) state changing its resonant frequency from the HF state to the LF state for at least 2N excitation cycles 34 and 36. In contrast, second float resonator 20-2 is adapted to stay in the HF state for a first period 30 of N excitation cycles by primary coil 8, then switches to the LF state for second period 32 of N excitation cycles by primary coil 8, then switches back to the HF state for a third period 34 of N excitation cycles by primary coil 8, and finally switches to the LF state for a fourth period 36 of N excitation cycles. This cycle sequence of float resonators 20-1 and 20-2 represents a simple and efficient method of generating the blocks of cycles in each float resonator 20-1 and 20-2 using counters 22.

Each counter 22, e.g., without limitation, in the form of an 9-bit counter, can be adapted to cause the corresponding switch Q1 to change its state every 128 excitation cycles (e.g., float resonator 20-2) or 256 excitation cycles (e.g., float resonator 20-1). The ninth bit output of each such counter 22 will cause the switch Q1 to change its state every 256 excitation cycles. Blocks of other numbers of excitation cycles can be generated by specially designed circuits, but those are more complicated and, therefore, more power hungry. Such specifically designed counters might be required in sensors equipped with more than two float resonators 20-1 and 20-2.

FIGS. 4 and 5 illustrate exemplary timing sequences for a two float resonator 20-1 and 20-2 configuration that can be accomplished with a simple binary counter 22 in each float resonator 20-1 and 20-2. In a multiple float resonator configuration, where the number of float resonators is three or more, a special counting circuit may be used in each float resonator assuring that after the first block of N oscillation cycles by primary coil 8, one float resonator at a time is in resonance until all of the float resonators are interrogated. At this point, all of the float resonators can switch to the LF state for reference reading.

During the first block 30 of N excitation cycles in the two float resonator 20-1 and 20-2 configuration, each float resonator is in the HF resonance state (with switch Q1 of each float resonator in its open state) and the voltage generated by the resonator (L1, C1) of each float resonator charging the storage device 26 of the power supply circuit 24 of said float resonator. After the first block 30 of N excitation cycles (e.g., 128 cycles) are counted, the counter 22 of the second float resonator 20-2 turns its switch Q1 ON (closed state) changing the resonant frequency of its resonator from the HF resonance state to the LF resonance state during the second block 32 of N excitation cycles, e.g., another 128 cycles for a total of 256 cycles.

During the second block 32 of N excitation cycles, the resonator (L1, C1) of the first float resonator 20-1 stays in the HF resonance state and the second float resonator 20-2 switch Q1 is turned ON (closed) adding capacitor C2 to the resonator circuit, whereupon the resonant frequency of the second float resonator 20-2 is in the LF resonance state, which is substantially lower than the HF resonance state that second float resonator 20-2 was in during the first block 30 of N excitation cycles. This difference in resonance state causes the signals generated by second float resonator 20-2 in the first secondary coil 10 and, if provided, the second secondary coil 12 to diminish to nearly zero amplitude whereupon almost all the signals generated in secondary coils 10 and 12 are due to the HF resonance state of the resonator (L1, C1) of first float resonator 20-1. Desirably, near the middle of the second block 32 of N excitation cycles, the amplitudes induced in secondary coils 10 and 12 by first float resonator 20-1, including phase information, are measured for each secondary coil 10 and 12 and stored in the memory of control system 6. After the total of 2N excitation cycles 30 and 32, e.g., after 256 counts are counted, the counter 22 of second float resonator 20-2 turns its switch Q1 to OFF (open) state changing its resonant frequency from the LF state to the HF state and the counter 22 of the first float resonator 20-1 turns its switch to ON (closed) state position changing its resonant frequency from the HF state to the LF state. Where the counter 22 of each float resonator 20-1 and 20-2 is a 9 bit counter, after said counter 22 has counted 256 excitation cycles, said counter 22 recycles back to zero and starts counting anew. In this example, a 9 bit counter is used in each float resonator. In float resonator 1 (20-1) all of the bits of counter 22 thereof are used resulting in change of state of switch Q1 every 256 cycles of float resonator 20-1, which is half of the period of the output of said counter 22. In float resonator 2 (20-2), the $9^{th}$ bit of counter 22 thereof is not used, whereupon said counter 22 is used as an 8-bit counter such that the output of said counter 22 causes switch Q1 of float resonator 2 (20-2) to switch state every 128 cycles, which is half of the period of the output of said counter 22.

Each float resonator 20-1 and 20-2 includes a contact or jumper SW that can be coupled between the control input of switch Q1 and either the 128 or 256 count output of counter 22 depending upon when it is desired to have the appropriate float resonator switch from the HF state to the LF state, or vice versa. In the example being discussed in connection with FIGS. 4 and 5, jumper SW of first float resonator 20-1 is connected between the 256 count output of counter 22 and the control input of switch Q1, while the jumper SW of float resonator 20-2 is coupled between the 128 count output of counter 22 and the control input of switch Q1. However, this is not to be construed as limiting the invention since the control terminal of switch Q1 of float resonator 20-1 can be connected to the 128 count output of counter 22 thereof, while the control input of switch Q1 of float resonator 20-2 can be connected to the 256 count output of counter 22, if desired. Other combinations such as 64/128 or 256/512 are also possible. For that matter any N/2N number of cycles can be used as long as storage device 26 has sufficient charge.

During a third block 34 of N excitation cycles, e.g., another 128 counts, the resonator (L1, C1) of the second float resonator 20-2 is in resonance in the HF state in response to switch Q1 thereof being turned OFF (open), and the first float resonator 20-1 switch Q1 is turned ON (closed) adding capacitor C2 to the resonator circuit (L1, C1) thereby changing its resonant frequency from the HF state to the LF state. The resulting lack of resonance of the first float resonator 20-1 causes the signals generated by the first float resonator 20-1 in the secondary coils 10 and 12 to diminish to nearly zero amplitude whereupon almost all the signals generated in the secondary coils 10 and 12 are due to the oscillations in the resonator (L1, C1) of the second float resonator 20-2 in the HF state.

Desirably, near the middle of the third block 34 of N excitation cycles, the amplitudes induced in the first secondary coil 10 and, if provided, the second secondary coil 12 by the second float resonator 20-2, including phase information, are measured for each secondary coil 10 and 12 and stored in the memory of control system 6. After the total of 3N excitation cycles in blocks 30, 32 and 34 are counted, the counter 22 of second float resonator 20-2 turns its switch Q1 to ON (closed) position changing its resonant frequency from the HF state to the LF state.

During a fourth block 36 of N excitation cycles, e.g., another 128 counts—for a total of 512 counts, both the first float resonator 20-1 and the second float resonator 20-2 have their respective switches Q1 turned to ON (closed) state whereupon their respective resonators (L1, C1 and C2) are tuned to the LF state and are not in resonance with the frequency of the excitation signal output by primary coil 8. For both float resonators 20-1 and 20-2, the signals generated in secondary coils 10 and 12 diminish to nearly zero amplitude. The signals measured by control system 6 on each secondary coil 10 and 12 at this point in time represent what can be defined as a baseline or reference signal level comprised of parasitic coupling between primary coil 8 and each secondary coil 10 and 12 and the residual coupling through float resonators 20-1 and 20-2 in their non-resonance states. Desirably, near the middle of the fourth block of N excitation cycles, the amplitudes, including the phase information, of the signals output by secondary coils 10 and 12 are measured and stored in the memory of control system 6.

Once the fourth block 36 of N excitation cycles are completed, the stored signals (amplitudes and phases) output by secondary coils 10 and 12 during the fourth block 36 of N excitation cycles can, optionally, be numerically subtracted by control system 6 from the stored signals output by secondary coils 10 and 12 during the respective second and third blocks 32 and 34 of N excitation cycles and the results of this subtraction can be stored in the memory of the control system 6 as quadrature information for each float. Alternatively, the amplitude and phases output by secondary coils 10 and 12 during the respective second and third blocks 32 and 34 of N excitation cycles can be utilized directly as the quadrature information for each float. Numerical analysis of either quadrature information can then be used by control system 6 to determine position information for each float resonator 20-1 and 20-2 along the length of tube 2. This position information can be communicated by control system 6 for external display and/or processing.

In FIGS. 4 and 5, when float resonators 20-1 and 20-2 are in their respective standby and reset states, the resonator thereof is in the HF state for the purpose of either charging electrical storage device 26 or measurements.

As shown in FIG. 2, the winding density distributions of secondary coils 10 and 12 are different along the length of tube 2. Hence, at each point along the length of tube 2, the combinations of the amplitudes and phases output by secondary coils 10 and 12 are unique. By knowing the amplitudes and phases output by secondary coils 10 and 12 in response to the measurement of the amplitudes and phases in secondary coils 10 and 12 during the second and third blocks 32 and 34 of N excitation cycles, control system 6 can determine the location of each float resonator along the length of tube 2.

The sensor system of FIG. 1 can be used with one or two or more float resonators 20. In the latter case, the counters 22 of said two or more float resonators 20 are adapted to turn their respective switches Q1 ON (closed) and OFF (open) at proper times to facilitate the unique measurement of the position of each float resonator independent of the measurement of the position of the other float resonators.

One desirable float resonator 20 embodiment includes a resonator circuit that in a first state is tuned to a higher frequency and after a predetermined number of excitation cycles changes its resonant frequency to a lower frequency. An advantage of this approach is a higher charging efficiency at the higher frequency and lower coupling noise at the lower frequency. The circuit, however, could be designed to operate on the reverse sequence of resonant frequencies.

Signal acquisition can be performed during excitation. However, some parasitic coupling may occur between primary coil 8 and each secondary coil 10 and 12. This parasitic coupling can be compensated for by measuring each secondary coil 10 and 12 when the float resonators 20-1 and 20-2 are not in resonance. Another approach to minimizing parasitic coupling is to interrupt the excitation for a period shorter than the reset period and measure the signal coming from the other float resonator 20 that is in resonance with the excitation frequency and still resonating after the excitation stopped. A minimum of one or one and one-half of a cycle interruption is desired to effectively apply this method.

Figure 6:
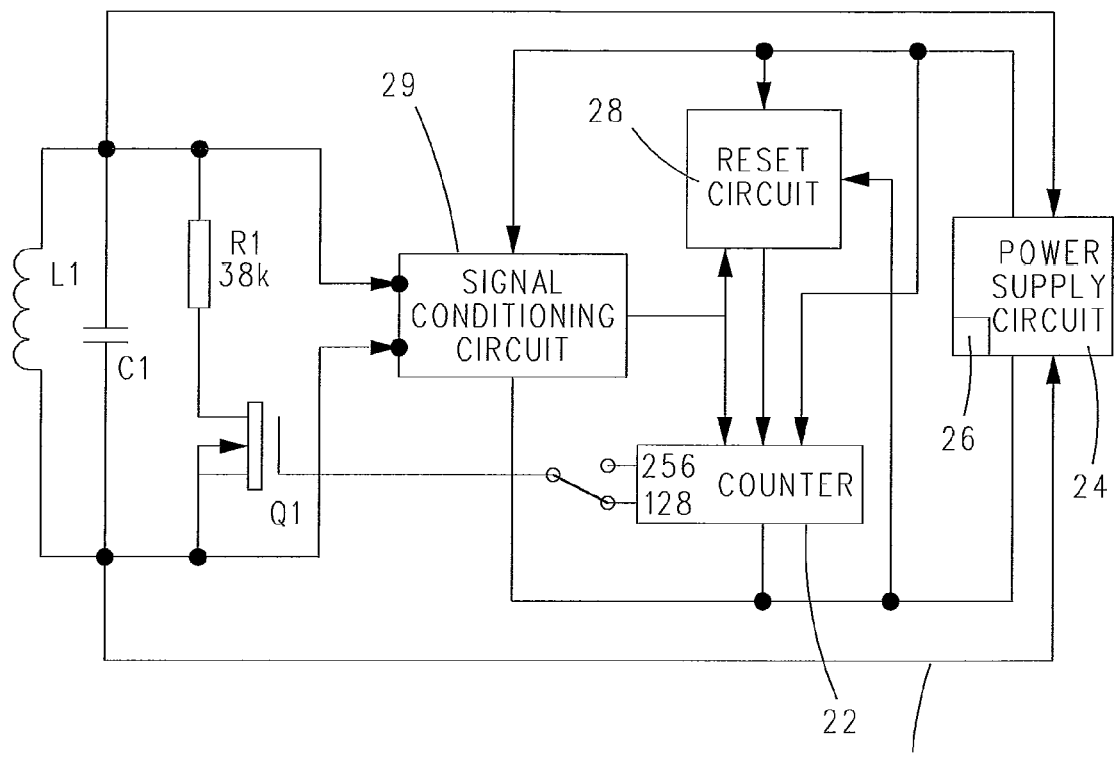
FIG. 6 is a combined block diagram and schematic illustration of another embodiment resonator circuit that can comprise the sensor system shown in FIGS. 1 and 2.

With reference to FIG. 6 and with continuing reference to FIGS. 1 and 2, a float resonator 40 in accordance with another embodiment comprises coil L1, capacitor C1 and a resistor R1 in replacement of capacitor C2 in the embodiment shown in FIG. 3. Resistor R1 is controlled by switch Q1. When the switch Q1 is in the OFF (or open) state, resistor R1 is disconnected and float resonator 40 resonates at a high amplitude (HA) state determined by L1 and C1 in parallel. In one desirable embodiment, the resonant frequency of L1 in parallel with C1 is 2500 Hz. When the switch Q1 is turned to its ON (or closed) state, resistor R1 is coupled in parallel with L1 and C1, whereupon the float resonator 40 resonates at a low amplitude (LA) state whereupon the energy of the resonator dissipates in R1 resulting in a substantial reduction of amplitude of oscillations. In one embodiment, the amplitude of oscillations in the LA state is reduced by a factor of about one hundred over the amplitude of oscillations in the HA state.

Figure 7:
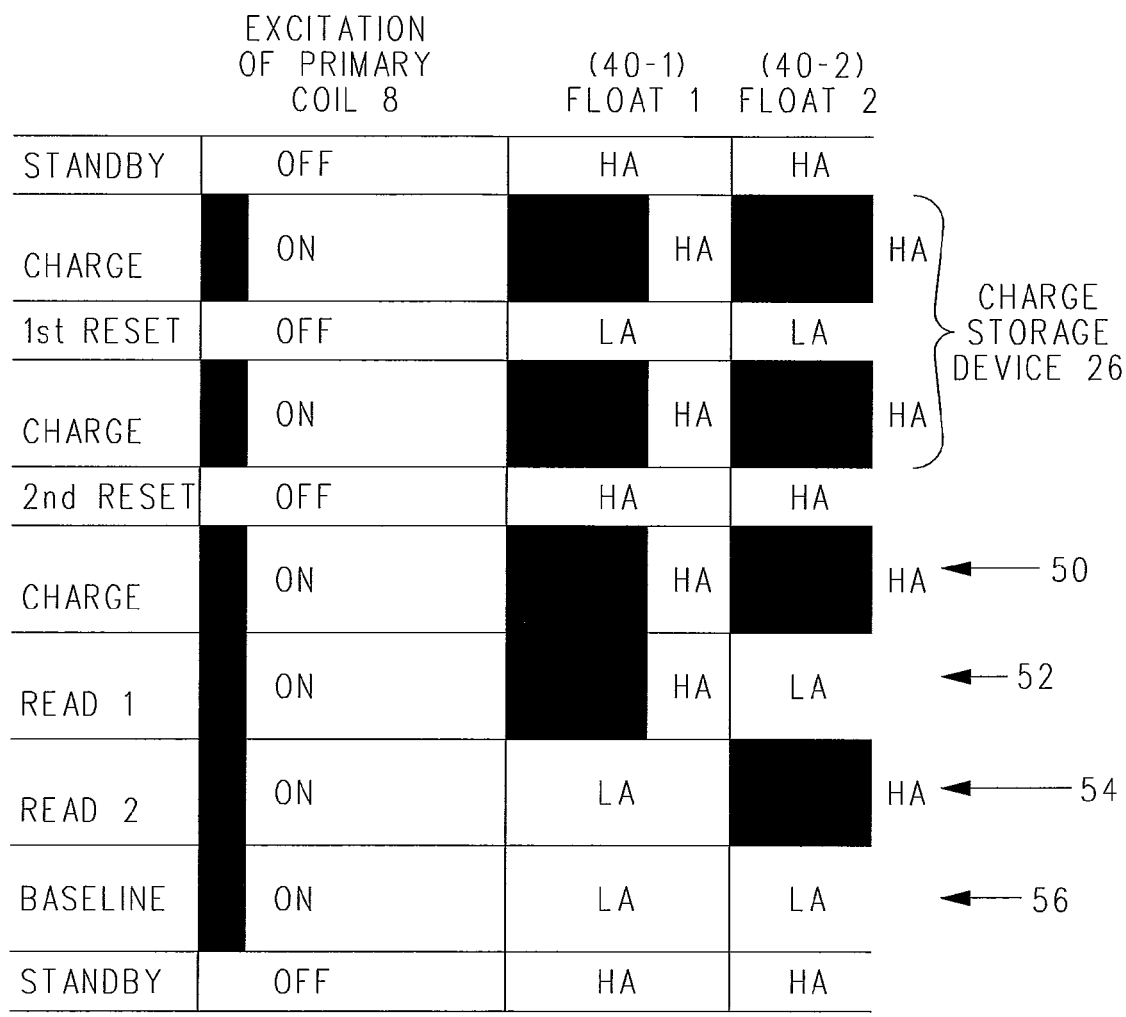
FIG. 7 is an exemplary timing sequence for a two-float resonator sensor system, wherein each float resonator includes the resonator circuit as shown in FIG. 6, wherein high amplitudes are graphically illustrated by grey bars and low amplitudes are represented as vertical lines.

With reference to FIG. 7 and with continuing reference to FIGS. 1, 2 and 6, in an embodiment where the sensor system is equipped with two float resonators, e.g., 40-1 and 40-2, of the type shown in FIG. 6, after charging of storage device 26 is complete, the first float resonator 40-1 is set to its high amplitude (HA) state for two blocks, 50 and 52, of 2N excitation cycles by primary coil 8 (where each block comprises N excitation cycles), whereupon at the beginning of the third block 54 of N excitation cycles, the counter circuit 22 of float resonator 40-1 turns its switch to the ON (closed) state changing its amplitude to low amplitude (LA) state for at least 2N periods of excitation cycles 54 and 56. In contrast, the second float resonator 40-2 is set to stay in the HA state for a first block 50 of N excitation cycles by primary coil 8, then switches to the LA state for a second block 52 of N excitation cycles by primary coil 8, then switches back to HA state for a third block 54 of N excitation cycles by primary coil 8, and, finally, switches to the LA state for a fourth block 56 of N excitation cycles.

Desirably, near the middle of second and third blocks 52 and 54 of N excitation cycles, the amplitudes induced in secondary coils 10 and 12 by first float resonator 40-1 (during second block 52) and by second float resonator 40-2 (during third block 54), including phase information, are measured for each secondary coil 10 and 12 and stored in the memory of control system 6. Desirably, near the middle of the fourth block 56 of N excitation cycles, the amplitudes induced in the first and second secondary coils 10 and 12, including phase information, are measured for each secondary coil 10 and 12 and stored in the memory of control system 6. Once the fourth block 56 of N excitation cycles are complete, the stored signals (amplitudes and phases) output by secondary coils 10 and 12 during the fourth block 56 of N excitation cycles can, optionally, be numerically subtracted by control system 6 from the stored signals output by secondary coils 10 and 12 during the respective second and third blocks 52 and 54 of N excitation cycles and the results of this subtraction can be stored in the memory of control system 6 as quadrature information.

Alternatively, control system 6 can utilize the amplitude and phase information measured during the respective second and third blocks 52 and 54 of N excitation cycles as the quadrature information. Numerical analysis of either quadrature information can then be used by control system 6 to produce position information for each float resonator along the length of tube 2. This position information can be communicated by control system 6 for external display and/or processing.

As shown in FIG. 7, during charging of the storage device 26 in each float resonator 40, said storage device 26 can be charged by maintaining said float resonator 40 in the HA state followed by a reset of the corresponding counter 22 whereupon said float resonator momentarily switches to the LA state and then back to the HA state. The process of charging storage device 26 in this manner can continue until a suitable voltage is impressed thereon. Alternatively, continuous excitation as shown in blocks 1-6 in FIG. 5, in combination with the HA state and the LA state (in replacement of the HF state and LF state in FIG. 6), can be utilized for charging the storage device of each float resonator 40.

As can be seen, a so-called battery-less float resonator can be implemented in one of two embodiments. The first embodiment shown in FIG. 3 includes an LC resonator formed by coil L1, capacitor C1 and second capacitor C2 selectively connected in parallel with L1 and C1 via a switch Q1. The switch is controlled by electronic circuitry comprised of a power supply circuit 24 including a storage device 26, a signal conditioning circuit 29, a reset circuit 28 and a binary counter 22.

When the switch Q1 is in OFF (open) state and the float resonator is excited by primary coil 8, L1 and C1 are in resonance and resonate at high frequency. This resonance is used to provide energy to the power supply circuit 24 which in turn charges storage device 26 and powers the rest of the electronic components. Once the voltage of storage device 26 charges to a desired level, counter 22 starts counting cycles of oscillations of the LC resonator. Desirably, counter 22 is a binary counter that switches the state of the switch Q1 between an ON (closed) and OFF (open) state and vice versa. When the switch is in the OFF (open) state the LC resonator is in tune with the excitation frequency f1 applied to primary coil 8 and it oscillates with peak amplitude. When the switch is in the ON (closed) state, capacitor C2 is added in parallel with L1 and C1 changing the resonance frequency of the oscillator to a second lower frequency f2. Due to the mismatch of the resonance frequency f2 and the excitation frequency f1, the amplitude of LC resonator's oscillations is reduced and the phase of the oscillations in the resonator is shifted with respect to the excitation signal.

Control system 6 includes suitable means to measure the change of the amplitude (and phase) in secondary coils 10 and 12 and uses this information to calculate the position of float resonator along tube 2. Desirably, switch Q1 is normally in the OFF (open) state to permit charging of the storage device 26 before counter 22 becomes active. In principle the two frequencies could be exchanged and the charging and measurements be performed at the lower of the two frequencies, but efficiency of the system would suffer.

In the second embodiment shown in FIG. 6, the float resonator circuit includes an LC resonator formed by coil L1 and capacitor C1, and a resistor R1 is selectively connected in parallel with L1 and C1 via switch Q1. The switch is controlled by electronic circuitry comprised of a power supply circuit 24 including a storage device 26, a signal conditioning circuit 29, a reset circuit 28 and a binary counter 22.

When switch Q1 is in its OFF (open) state and the float resonator is excited by primary coil 8, the LC circuit resonates at high amplitude voltage. This resonant signal is used to provide energy to the power supply circuit 24 which in turn charges storage device 26 and powers the rest of the electronic components. Once the voltage of storage device 26 charges to a desired level, counter 22 starts counting cycles of oscillations of the LC resonator. Desirably, counter 22 is a binary counter that switches the state of the switch Q1 between an ON (closed) and OFF (open) state. When switch Q1 is in the OFF (open) state, the LC resonator is in tune with the excitation frequency f1 applied to primary coil 8 and it oscillates at the high amplitude. When switch Q1 is in the ON (closed) state, resistor R1 is added in parallel with L1 and C1. Addition of resistor R1 in parallel with L1 and C1 dissipates part of the power coming to the float resonator from the primary coil 8 resulting in a reduction of the amplitude of oscillations. Control system 6 includes suitable means to measure the change of the amplitude (and phase) in secondary coils 10 and 12 and uses this information to calculate the position of a float resonator along tube 2. Desirably, switch Q1 is normally in the OFF (open) state to permit charging of storage device 26 to a desired level before counter 22 becomes active.

Desirably, electronic circuitry comprised of power supply circuit 24 including storage device 26, signal conditioning circuit 29, reset circuit 28, and binary counter 22 shown in FIGS. 3 and 6 becomes active after one or a few cycles of excitation applied to primary coil 8, while charging of storage device 26 of each float resonator to a desired level takes N or 2N cycles (128 or 256 cycles) of the excitation frequency applied to primary coil 8. However, this is not to be construed as limiting the invention.

In the second embodiment where resistor R1 used to modulate the amplitude of oscillations, the resonant frequency of L1 and C1 in parallel is constant. It is the same frequency in high amplitude (HA) state and in low amplitude (LA) state. This feature reduces the transition time between the two states and produces more uniform blocks of oscillations. Also, since capacitor C2 required to change the resonant frequency of the first embodiment must be relatively large, it is more expensive and requires more space than resistor R1. With shorter transition time, the block size N can be reduced resulting in faster measurements.

In both embodiments described above, the excitation can be implemented using the excitation sequences shown in FIGS. 4, 5 and 7. If two battery-less float resonators 20-1 and 20-2, or 40-1 and 40-2 are used, one of the float resonators can be set to blocks of N cycles (e.g., 128 cycles) between its transitions and the other float resonator can be set to blocks of 2N cycles (e.g., 256 cycles) between its transitions. FIGS. 4 and 7 illustrate charging sequences where charging excitation is provided in a series of blocks of N excitation cycles separated by a first reset period of sufficient duration to activate the reset circuit in each float resonator followed by a second reset period followed by 4N blocks of cycles 30-36 or 50-56 during which measurements are performed. FIG. 5 illustrates a sequence where excitation is provided continuously during the charging stage for a duration of multiples of N blocks of cycles (e.g., 6 blocks of cycles) followed by a reset period followed by 4N blocks of cycles 30-36 during which measurements are performed. For larger values of N, the sequences shown in FIGS. 4 and 7 are faster since the reset time can be significantly shorter than the duration of N blocks of cycles. For smaller values of N, the sequence shown in FIG. 5 is simpler and equally effective.

In FIG. 7, when each float resonator 40-1 and 40-2 is in the standby or reset state, the resonator thereof is in the HA state for the purpose of either charging electrical storage device 26 thereof or for measurement purposes. In practice, each standby state shown in FIGS. 4, 5 and 7 is effectively a very long instance of a reset state.

Herein, the use of two float resonators and two secondary coils have been described. However, as would be appreciated by one of ordinary skill in the art, a sensor system including a single float resonator of any embodiment 20 or 40 disclosed herein and/or a single secondary coil wound at a periodically varying winding density distribution can be utilized, albeit with less accuracy for detecting the level of a single fluid.

In each of the embodiments discussed above, the primary coil 8 is excited with a time varying signal having a frequency that is desirably the same as the resonant frequency of L1 in parallel with C1. However, this is not to be construed as limiting the invention.

As used herein, the term "storage device" is intended to encompass any type of electrical storage device that can be recharged. This includes capacitors and secondary, rechargeable batteries which are designed to be recharged and used multiple times. However, "storage device" is not intended to encompass primary, disposable batteries which are designed to be used once and discarded. Hence, the storage devices discussed herein can be secondary, rechargeable batteries, capacitors, or any other suitable and/or desirable device that can accept and hold a charge that can be utilized to power the rest of the electronic components of either embodiment float resonator described herein.

This invention has been described with reference to exemplary embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A fluid level sensor system comprising:
a primary coil;
at least one secondary coil adjacent the primary coil;
a control system operative for applying a time varying signal to the primary coil and for detecting a response of the secondary coil to the time varying signal in the primary coil; and
at least one float resonator adapted to move adjacent the primary and secondary coils, wherein each float resonator includes an electrical storage device that is chargeable in response to the time varying signal in the primary coil and a circuit which is switchable between:
a first state that enhances the response of a section of the secondary coil adjacent the float resonator to the time varying signal in the primary coil and the charging of the electrical storage device; and
a second state where the effect of the circuit on the response of the secondary coil to the time varying signal in the primary coil is diminished relative to the first state.

2. The system of claim 1, wherein the electrical storage device is a secondary, rechargeable battery or a capacitor, but is not a primary, disposable battery designed to be used once and then discarded.

3. The system of claim 1, wherein:
in the first state, the circuit enhances coupling of the time varying signal to the section of the secondary coil adjacent the float resonator; and
in the second state, the circuit does not enhance coupling of the time varying signal to the section of the secondary coil adjacent the float resonator.

4. The system of claim 3, wherein:
in the first state, the circuit is substantially in resonance with the time varying signal; and
in the second state, the circuit is substantially out of resonance with the time varying signal.

5. The system of claim 1, wherein:
in each state, the circuit is substantially in resonance with the time varying signal; and
in the second state, the circuit dissipates electrical energy that would not be dissipated by the circuit in the first state.

6. The system of claim 1, wherein:
the electrical storage device charges when the circuit is in the first state; and
following charging of the electrical storage device, the control system samples the response of the secondary coil to the time varying signal in the primary coil when the circuit is in the first state.

7. The system of claim 1, wherein the secondary coil has a winding density distribution that facilitates the control system determining a position of the float resonator adjacent the secondary winding based on the sampled response of the secondary coil to the time varying signal in the primary coil when the circuit is in the first state.

8. The system of claim 1, including first and second float resonators, the first float resonator adapted to float on a first fluid having a first density that floats atop of a second fluid having a second, greater density, the second float resonator adapted to float on the second fluid, wherein:
   when the circuits of the first and second float resonators are in their respective first and second states, the control system samples a first response of the secondary coil to the time varying signal in the primary coil corresponding to a position of the first float resonator adjacent the secondary coil; and
   when the circuits of the first and second float resonators are in their respective second and first states, the control system samples a second response of the secondary coil to the time varying signal in the primary coil corresponding to a position of the second float resonator adjacent the secondary coil.

9. The system of claim 8, wherein each circuit includes a counter operating under the control of a reset circuit for controlling when the circuit is in the first state or the second state.

10. The system of claim 9, wherein, the reset circuit of each float resonator after a period following termination of the time varying signal in the primary coil, outputs to the counter of said float resonator a reset signal that causes said counter to maintain or switch the circuit to the first state.

11. The system of claim 1, wherein the circuit includes a first capacitor (C1) and a coil (L1) in parallel with a series combination of a switch (Q1) and a second capacitor (C2), wherein:
   in the first state of the circuit, the switch is open whereupon C2 is not connected in parallel with C1 and L1 and the circuit has a first resonant frequency; and
   in the second state of the circuit, the switch is closed whereupon C2 is connected in parallel with C1 and L1 and the circuit has a second resonant frequency that is lower than the first resonant frequency.

12. The system of claim 1, wherein the circuit includes a first capacitor (C1) and a coil (L1) in parallel with a series combination of a switch (Q1) and a resistor (R1), wherein:
   in the first state of the circuit, the switch is open wherein R1 is not connected in parallel with C1 and L1 and R1 does not dissipate electrical energy; and
   in the second state of the circuit, the switch is closed wherein R1 is connected in parallel with C1 and L1 and R1 dissipates electrical energy.

13. The system of claim 12, wherein:
   when the circuit is in the first state, the secondary coil outputs a signal having a first amplitude in response to the time varying signal in the primary coil; and
   when the circuit is in the second state, the secondary coil outputs a signal having a second, lower amplitude in response to the time varying signal in the primary coil.

14. The system of claim 1, wherein the control system is operative for:
   detecting a first response of the secondary coil to the time varying signal in the primary coil corresponding to a position of the float resonator adjacent the secondary coil when the circuit is in the first state;
   detecting a second response of the secondary coil to the time varying signal in the primary coil corresponding to the position of the float resonator adjacent the secondary coil when the circuit is in the second state; and
   determining the position of, the float resonator along the secondary coil based on a difference between the first and second detected responses.

15. A fluid level sensor system comprising:
   a plurality of elongated, coaxial coils including a primary coil, a first secondary coil and a second secondary coil;
   a control system operative for applying a time varying signal to the primary coil and for detecting responses of the first and second secondary coils to the time varying signal in the primary coil; and
   first and second float resonators, the first float resonator adapted to float on a first fluid having a first density that floats atop of a second fluid having a second, greater density, the second float resonator adapted to float on the second fluid, wherein each float resonator includes an electrical storage device and a circuit which is switchable between:
   a first state that enhances the response of sections of the first and second secondary coils adjacent the float resonator to the time varying signal in the primary coil and the charging of the electrical storage device of said float resonator; and
   a second state where the effect of the circuit on the response of the first and second secondary coils to the time varying signal in the primary coil is diminished relative to the first state;
   wherein:
   the circuits of the first and second float resonators are adapted to be in their respective first and second states when the control system detects the response of the first and second secondary coils to the time varying signal in the primary coil corresponding to the position of the first float resonator along the length of the plurality of coils; and
   the circuits of the first and second float resonators are adapted to be in their respective second and first states when the control system detects the response of the first and second secondary coils to the time varying signal in the primary coil corresponding to the position of the second float resonator along the length of the plurality of coils.

16. The system of claim 15, wherein the electrical storage device is a secondary, rechargeable battery or a capacitor, but is not a primary, disposable battery designed to be used once and then discarded.

17. The system of claim 15, wherein the circuit of each float resonator in the second state diminishes the charging of the electrical storage device of said float resonator relative to when said circuit is in the first state.

18. The system of claim 15, wherein:
   in the first state, the circuit of each float resonator enhances coupling of the time varying signal to the section of the first and second secondary coils adjacent said float resonator; and
   in the second state, the circuit of each float resonator does not enhance coupling of the time varying signal to the section of the first and second secondary coils adjacent said float resonator.

19. The system of claim 18, wherein:
   in the first state, the circuit of each float resonator is substantially in resonance with the time varying signal; and
   in the second state, the circuit of each float resonator is substantially out of resonance with the time varying signal.

20. The system of claim 15, wherein:
   in each state, the circuit of each float resonator is substantially in resonance with the time varying signal; and in the second state, the circuit of each float resonator dissipates electrical energy that would not be dissipated by the circuit in the first state.

21. In a sensor system comprising an elongated primary coil; a plurality of elongated secondary coils coaxial with the primary coil; a control system operative for applying a time varying signal to the primary coil and for detecting a response of each secondary coil to the time varying signal in the primary coil; and first and second float resonators adapted to move adjacent the primary and secondary coils, wherein each float resonator includes an electrical storage device and a circuit that is switchable between: a first state that enhances the effect of the float resonator on the responses of sections of the secondary coils adjacent the float resonator to the time varying signal in the primary coil and the charging of the electrical storage device of said float resonator; and a second state that does not enhance the effect of the float resonator on the responses of sections of the secondary coils adjacent the float resonator to the time varying signal in the primary coil, a method of operation comprising:
   (a) causing the circuit of each float resonator to be in the first state during charging of the electrical storage device of said float resonator via the time varying signal in the primary coil;
   (b) following step (a), the control system detecting a first response of the secondary coils to the time varying signal in the primary coil when the circuits of the first and second float resonators are in their respective first and second states;
   (c) following step (b), the control system detecting a second response of the secondary coils to the time varying signal in the primary coil when the circuits of the first and second float resonators are in their respective second and first states; and
   (d) following step (c), the control system determining positions of the first and second float resonators along the elongated secondary coils based on the respective first and second detected responses.

22. The method of claim 21, wherein the electrical storage device is a secondary, rechargeable battery or a capacitor, but is not a primary, disposable battery designed to be used once and then discarded.

23. The method of claim 21, wherein the first and second states of each float resonator correspond to respective increased and not increased magnetic coupling between the primary coil and the secondary coils.

24. The method of claim 21, wherein the second state of each float resonator corresponds to decreased energy transfer from the primary coil to the secondary coils relative to the energy transfer in the first state of said float resonator.

\* \* \* \* \*